United States Patent
Yoshino et al.

(10) Patent No.: US 12,466,845 B2
(45) Date of Patent: Nov. 11, 2025

(54) METHOD FOR PRODUCING TRIORGANOSILANE COMPOUND

(71) Applicant: NISSAN CHEMICAL CORPORATION, Tokyo (JP)

(72) Inventors: Madoka Yoshino, Funabashi (JP); Kazuya Wakui, Funabashi (JP); Akihiro Nagaya, Funabashi (JP)

(73) Assignee: NISSAN CHEMICAL CORPORATION, Tokyo (JP)

(*) Notice: Subject to any disclaimer, the term of this patent is extended or adjusted under 35 U.S.C. 154(b) by 844 days.

(21) Appl. No.: 17/606,198

(22) PCT Filed: Apr. 23, 2020

(86) PCT No.: PCT/JP2020/017478
§ 371 (c)(1),
(2) Date: Oct. 25, 2021

(87) PCT Pub. No.: WO2020/218413
PCT Pub. Date: Oct. 29, 2020

(65) Prior Publication Data
US 2022/0220133 A1 Jul. 14, 2022

(30) Foreign Application Priority Data
Apr. 26, 2019 (JP) ................... 2019-086647

(51) Int. Cl.
C07F 7/08 (2006.01)
(52) U.S. Cl.
CPC .......... *C07F 7/0827* (2013.01); *C07F 7/0834* (2013.01)
(58) Field of Classification Search
CPC ..... C07F 7/0827; C07F 7/0834; C07F 7/0896
See application file for complete search history.

(56) References Cited

FOREIGN PATENT DOCUMENTS

| DE | 3632792 A1 | 4/1988 |
|----|------------|--------|
| EP | 2816087 B1 | 11/2016 |
| JP | 2004307392 A | * 11/2004 |
| WO | WO 2019/069978 A1 | 4/2019 |

OTHER PUBLICATIONS

Yoshida et al. JP2004307392A Description_English Translation (Year: 2004).*
Uhlig et al. Journal of Organometallic Chemistry, 378 (1989) (Year: 1989).*
Uhlig, Journal of Organometallic Chemistry, 2003, 685, 70-78 (Year: 2003).*
Soldner et al. J. Organomet. Chem. 1996, 521, 295-299 (Year: 1996).*
Schenkel et al. Tetrahedron 1990, 46. 3. 1009-1024 (Year: 1990).*
Katz Organometallics 1986, 5, 2308-2311 (Year: 1986).*
Bassindale et al. Journal of Organometallic Chemistry, 1984, 271, C1-C3 (Year: 1984).*
Doyle et al. J. Am. Chem. Soc. 1975, 97, 13, 3777-3781 (Year: 1975).*
Wiesenfeldt et al. Angew. Chem. Int. Ed. 2018, 57, 8297-8300 (Year: 2018).*
Tanino et al. Tet. Lett. 2000, 41, 9281-9285 (Year: 2000).*
Hamasaka et al., "Synthesis of Silica-Supported Compact Phosphines and Their Application to Rhodium-Catalyzed Hydrosilylation of Hindered Ketones with Triorganosilanes," *Organometallics*, 27: 6495-6506 (2008).
Intellectual Property India, Examination Report in Indian Patent Application No. 202147053054 (May 4, 2023).
Chadeayne et al., "The Course of $(R_2R'SiO)_3TaCl_2$ (R = $^tBu$, R' = H, Me, Ph, tBu (silox); R = $^iPr$, R' = $^tBu$, $^iPr$) Reduction Is Dependent on Siloxide Size," *Inorg. Chem.*, 43(11): 3421-3432 (2004).
Chen et al., "Brønsted Acid-Promoted Formation of Stabilized Silylium Ions for Catalytic Friedel-Crafts C—H Silylation," *J. Am. Chem. Soc.*, 138(25): 7868-7871 (2016).

(Continued)

*Primary Examiner* — Sally A Merkling
*Assistant Examiner* — Jordan W Taylor
(74) *Attorney, Agent, or Firm* — Leydig, Voit & Mayer, Ltd.

(57) ABSTRACT

The invention provides a method for producing a triorganosilane compound which includes (1) a step of reacting a diorganosilane compound represented by the formula (I):

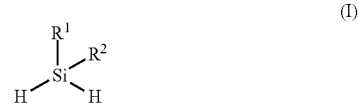

with a triflating reagent to obtain a monotriflate compound represented by the formula (III):

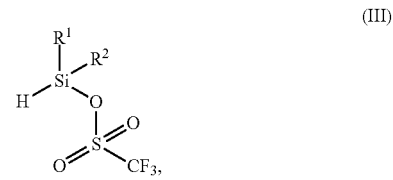

and
(2) a step of reacting the monotriflate compound obtained in the step (1) with a metal reagent represented by $R^3Li$ or $R^3MgX$ to obtain a triorganosilane compound represented by the formula (II):

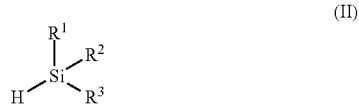

wherein $R^1$, $R^2$ and $R^3$ are as defined herein.

12 Claims, No Drawings

(56) References Cited

OTHER PUBLICATIONS

Kim et al., "The Formation of Dendrimeric Silane on Poly(carbosilane): Silane Arborols (V)," *J. Kor. Chem. Soc.*, 40(5): 347-356 (1996).
Liang et al., "Di-tert-butylisobutylsilyl, Another Useful Protecting Group," *Org. Lett.*, 13(15): 4120-4123 (2011).
Miller et al., "Regioselective Allene Hydrosilylation Catalyzed by N-Heterocyclic Carbene Complexes of Nickel and Palladium," *J. Am. Chem. Soc.*, 135(41): 15282-15285 (2013).
Uhlíg et al., "Neuartige Silyltriflat-Derivate [Novel Silyl Triflate Derivatives]," *J. Organometallic Chem.*, 378(1): C1-C5 (1989).
Wiesenfeldt et al., "Silylarene Hydrogenation: A Strategic Approach that Enables Direct Access to Versatile Silylated Saturated Carbo- and Heterocycles," *Angew. Chem. Int. Ed.*, 57(27): 8297-8300 (2018).
Japanese Patent Office, International Search Report in International Patent Application No. PCT/JP2020/017478 (Jun. 30, 2020).
Molander et al., "Preparation of Novel (Fluoroaryl)silanes and Their Applications in the Organoyttrium-Catalyzed Hydrosilylation of Alkenes and Oxidation to Alcohols," *Organometallics*, 17(25): 5504-5512 (1998).
Yamanoi et al., "Efficient Preparation of Monohydrosilanes Using Palladium-Catalyzed Si—C Bond Formation," *Organic Letters*, 9(22): 4543-4546 (2007).
European Patent Office, Extended European Search Report in European Patent Application No. 20795713.5 (Mar. 31, 2023).

\* cited by examiner

METHOD FOR PRODUCING TRIORGANOSILANE COMPOUND

TECHNICAL FIELD

The present invention relates to a novel method for producing a triorganosilane compound.

BACKGROUND ART

A triorganosilane compound has been used as a silyl protecting agent capable of applying to various functional groups in synthetic intermediates of organic compounds (Non-Patent Document 1).

As a method for producing the triorganosilane compound, it has been known a method in which a secondary aliphatic hydrocarbon group or an aryl group is introduced into a dialkylsilane compound (Non-Patent Documents 2 and 3).

Also, when an aryl group is contained in a substituent(s) of an organosilane compound, it has been known a method in which the aryl group is converted into a cycloalkyl group by hydrogenation reaction (Non-Patent Document 4).

PRIOR ART DOCUMENTS

Non-Patent Documents

Non-Patent Document 1: Organic Letters, 2011, vol. 13, pp. 4120-4123
Non-Patent Document 2: Journal of American Chemical Society, 2013, vol. 135, pp. 15282-15285
Non-Patent Document 3: Inorganic Chemistry, 2004, vol. 43, pp. 3421-3432
Non-Patent Document 4: Angewandte Chemie International Edition, 2018, vol. 57, pp. 8297-8300

SUMMARY OF THE INVENTION

Problems to be Solved by the Invention

When a secondary aliphatic hydrocarbon group is introduced into di-t-butylsilane by the method described in Non-Patent Document 2, there are problems that the yield is medium and an undesired isomer is formed.

Also, when an aryl group is introduced into di-t-butylsilane by the method described in Non-Patent Document 3, there is a problem that a high temperature condition that is stirring under reflux by heating is required. Incidentally, according to confirmation by the inventors, when an aryllithium prepared from a halogenated aryl compound and n-butyllithium or sec-butyllithium reagent was used, it was found that the aryl group could not be efficiently introduced. Further, in the method described in Non-Patent Document 3, it was also found that the reaction of introducing sec-butyllithium was low yield.

Thus, the present inventors have intensively studied and as a result, they have found that the above-mentioned problems have been solved by using a specific intermediate, whereby the present invention has completed. That is, the present invention has the following characteristics.

[1]
A method for producing a triorganosilane compound which comprises the following steps (1) and (2):
(1) a step of reacting a diorganosilane compound represented by the formula (I):

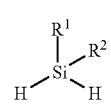

[wherein $R^1$ and $R^2$ each independently represent a secondary or tertiary alkyl group having 4 or more carbon atoms which may have a substituent(s), a cycloalkyl group having 3 or more carbon atoms which may have a substituent(s), an aryl group having 6 or more carbon atoms which may have a substituent(s) or an aralkyl group having 7 or more carbon atoms which may have a substituent(s)],
with a triflating reagent to obtain a monotriflate compound represented by the formula (III):

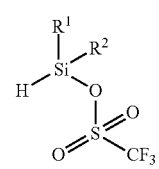

[wherein $R^1$ and $R^2$ have the same meanings as defined above]; and
(2) a step of reacting the monotriflate compound obtained in the step (1) with a metal reagent represented by $R^3Li$ or $R^3MgX$
(wherein $R^3$ represents an alkyl group having 3 or more carbon atoms which may have a substituent(s), a cycloalkyl group having 3 or more carbon atoms which may have a substituent(s), an aryl group having 6 or more carbon atoms which may have a substituent(s) or an aralkyl group having 7 or more carbon atoms which may have a substituent(s), and X represents a chlorine atom, a bromine atom or an iodine atom), to obtain a triorganosilane compound represented by the formula (II):

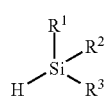

[wherein $R^1$, $R^2$ and $R^3$ have the same meanings as defined above].

[2]
The method for producing a triorganosilane compound described in [1], wherein $R^1$ and $R^2$ each independently are a secondary or tertiary $C_{4-6}$ alkyl group.

[3]
The method for producing a triorganosilane compound described in [2], wherein $R^1$ and $R^2$ each independently are a tertiary $C_{4-6}$ alkyl group.

[4]
The method for producing a triorganosilane compound described in [3], wherein $R^1$ and $R^2$ each independently are a tert-butyl group.

[5]
The method for producing a triorganosilane compound described in any one of [1] to [4], wherein the metal reagent is $R^3Li$.

[6]

The method for producing a triorganosilane compound described in [5], wherein $R^3$ is a $C_{3-6}$ alkyl group or a $C_{6-12}$ aryl group which may have a substituent(s).

[7]

The method for producing a triorganosilane compound described in [6], wherein $R^3$ is a $C_{3-6}$ alkyl group.

[8]

The method for producing a triorganosilane compound described in [7], wherein $R^3$ is a sec-butyl group or an n-butyl group.

[9]

The method for producing a triorganosilane compound described in [6], wherein $R^3$ is a $C_{6-12}$ aryl group which may have a substituent(s).

[10]

The method for producing a triorganosilane compound described in [9], wherein $R^3$ is a phenyl group which may have a substituent(s).

[11]

The method for producing a triorganosilane compound described in [9], wherein $R^3Li$ is a $C_{6-12}$ aryllithium which may have a substituent(s) prepared from a halogenated $C_{6-12}$ aryl which may have a substituent(s).

[12]

The method for producing a triorganosilane compound described in [9], wherein $R^3Li$ is a $C_{6-12}$ aryllithium which may have a substituent(s) prepared by using a halogenated $C_{6-12}$ aryl which may have a substituent(s) and n-butyllithium or sec-butyllithium.

[13]

The method for producing a triorganosilane compound described in any one of [1] to [4], wherein the metal reagent is $R^3MgX$.

[14]

The method for producing a triorganosilane compound described in [13], wherein $R^3$ is a $C_{7-13}$ aralkyl group.

[15]

The method for producing a triorganosilane compound described in [14], wherein $R^3$ is a benzyl group.

[16]

The method for producing a triorganosilane compound described in any one of [13] to [15], wherein X is a chlorine atom or a bromine atom.

[17]

The method for producing a triorganosilane compound described in any one of [1] to [16], wherein the triflating reagent is trifluoromethanesulfonic acid, trifluoromethanesulfonic anhydride, trifluoromethanesulfonyl chloride, N-(2-pyridyl)bis(tri-fluoromethanesulfonimide) or trimethylsilyl trifluoromethanesulfonate.

[18]

The method for producing a triorganosilane compound described in [17], wherein the triflating reagent is trifluoromethanesulfonic acid.

[19]

The method for producing a triorganosilane compound described in any one of [1] to [18], which further comprises the following step (3):

(3) among $R^1$, $R^2$ and $R^3$ of the triorganosilane compound obtained in the step (2), at least one of which is an aryl group having 6 or more carbon atoms which may have a substituent(s), a step of converting the aryl group into a cycloalkyl group by reacting with hydrogen in the presence of a metal catalyst.

[20]

The method for producing a triorganosilane compound described in [19], wherein among $R^1$, $R^2$ and $R^3$ of the triorganosilane compound obtained in the step (2), at least one of which is a phenyl group which may have a substituent(s).

[21]

The method for producing a triorganosilane compound described in [19] or [20], wherein the metal catalyst is ruthenium-alumina powder or rhodium carbon powder.

[22]

The method for producing a triorganosilane compound described in [21], wherein the metal catalyst is ruthenium-alumina powder.

EFFECT OF THE INVENTION

According to the present invention, a novel method for producing a triorganosilane compound could be provided.

EMBODIMENT TO CARRY OUT THE INVENTION

In the following, the present invention will be explained in more detail.

In the present specification, "n-" means normal, "s-" and "sec" mean secondary, "t-" and "tert-" mean tertiary, "Bu" means butyl, "Hex" means hexyl, "Ph" means phenyl, "c" means cyclo, "Bn" means benzyl, "Mes" means mesityl and "$cC_6H_{10}$" means cyclohexanediyl.

The terms "halogen atom" mean a fluorine atom, a chlorine atom, a bromine atom or an iodine atom.

The terms "$C_{1-40}$ alkyl group" mean a linear or branched alkyl group in which a carbon number is 1 to 40, and specific examples thereof may be mentioned a methyl group, an ethyl group, an n-propyl group, an isopropyl group, an n-butyl group, an isobutyl group, an s-butyl group, a t-butyl group, an n-pentyl group, an n-hexyl group, an octyl group, a decyl group, a dodecyl group, a hexadecyl group, an octadecyl group, a docosyl group, a triacontyl group, a tetracontyl group, a 3,7,11,15-tetramethyl-hexadecyl group, etc. Also, the terms "$C_{1-20}$ alkyl group" mean a linear or branched alkyl group in which a carbon number is 1 to 20, the terms "$C_{1-6}$ alkyl group" are that in which a carbon number is 1 to 6, and the terms "$C_{3-6}$ alkyl group" are that in which a carbon number is 3 to 6.

The terms "secondary or tertiary alkyl group having 4 or more carbon atoms" mean a secondary or tertiary alkyl group in which a carbon number is 4 or more, preferably a secondary or tertiary alkyl group in which a carbon number is 4 to 40, more preferably that in which a carbon number is 4 to 20, further preferably that in which a carbon number is 4 to 10, and particularly preferably that in which a carbon number is 4 to 6. Incidentally, the secondary or tertiary alkyl group means an alkyl group in which the bonding position as a group resides on a secondary or tertiary carbon. Specific examples thereof may be mentioned a 2-butyl group, a t-butyl group, a 3-pentyl group, a thexyl group, etc. Also, the terms "secondary or tertiary $C_{4-6}$ alkyl group" mean a secondary or tertiary alkyl group in which a carbon number is 4 to 6, and the terms "tertiary $C_{4-6}$ alkyl group" mean a tertiary alkyl group in which a carbon number is 4 to 6.

The terms "alkyl group having 3 or more carbon atoms" mean a linear or branched alkyl group in which a carbon number is 3 or more, preferably mean a linear or branched alkyl group in which a carbon number is 3 to 40, more preferably that in which a carbon number is 3 to 20, further preferably that in which a carbon number is 3 to 10, and particularly preferably that in which a carbon number is 3 to 6, and specific examples of the alkyl group having 3 or more carbon atoms may be mentioned an n-propyl group, an isopropyl group, an n-butyl group, a 2-butyl group, a t-butyl group, an n-pentyl group, a 3-pentyl group, an n-hexyl group, a thexyl group, etc.

The terms "cyclo alkyl group having 3 or more carbon atoms" mean a cyclic alkyl group in which a carbon number is 3 or more carbon atoms, preferably a cyclic alkyl group in which a carbon number is 3 to 40, more preferably that in which a carbon number is 3 to 20, further preferably that in which a carbon number is 3 to 10, and particularly preferably that in which a carbon number is 3 to 6. Specific examples of the cycloalkyl group having 3 or more carbon atoms may be mentioned a cyclopropyl group, a cyclobutyl group, a cyclopentyl group, a cyclohexyl group, etc.

The terms "aryl group having 6 or more carbon atoms" mean an aromatic hydrocarbon group in which a carbon number is 6 or more atoms, preferably an aromatic hydrocarbon group in which a carbon number is 6 to 40, more preferably that in which a carbon number is 6 to 20, and further preferably that in which a carbon number is 6 to 12. Specific examples of the aryl group having 6 or more carbon atoms may be mentioned a phenyl group, a 1-naphthyl group, a 2-naphthyl group, a 1-anthracenyl group, a 2-anthracenyl group, a 9-anthracenyl group, a biphenyl group, etc. Also, the terms "$C_{6-12}$ aryl group" mean an aryl group in which a carbon number is 6 to 12.

The terms "aralkyl group having 7 or more carbon atoms" mean an arylalkyl group in which a carbon number is 7 or more, preferably an arylalkyl group in which a carbon number is 7 to 40, more preferably that in which a carbon number is 7 to 20, and further preferably that in which a carbon number is 7 to 13. Specific examples of the aralkyl group having 7 or more carbon atoms may be mentioned a benzyl group, a 1-phenylethyl group, a 2-phenylethyl group, a 1-phenylpropyl group, a 2-phenylpropyl group, a 3-phenylpropyl group, a diphenylmethyl group, a naphthylmethyl group, a 1-naphthylethyl group, a 1-naphthylpropyl group, etc. Also, the terms "$C_{7-13}$ aralkyl group" mean an aralkyl group in which a carbon number is 7 to 13.

The terms "halogenated $C_{6-12}$ aryl" mean an aryl in which a carbon number is 6 to 12 and one or more hydrogen(s) on the aromatic ring is/are substituted by a halogen atom(s), and specific examples thereof may be mentioned chlorobenzene, bromo-benzene, iodobenzene, etc.

The terms "$C_{6-12}$ aryllithium" mean a compound in which a carbon number is 6 to 12 and that has a carbon-lithium bond, and specific examples thereof may be mentioned phenyllithium, 1-naphthyllithium, 2-naphthyllithium, etc.

The terms "which may have a substituent(s)" mean that it is unsubstituted, or substituted by an optional number of an optional substituent(s).

With regard to the above-mentioned "optional substituent(s)", the kind thereof is not particularly limited as long as it is a substituent which does not exert any bad effect to the reaction which is the target of the present invention.

The "substituent(s)" in "which may have a substituent(s)" is not particularly limited, and there may be mentioned, for example, a $C_{1-40}$ alkyl group, a hydroxy group, a $C_{1-40}$ alkoxy group, an acetoxy group, a di-$C_{1-40}$ alkylamino group, a halogen atom, etc., preferably a $C_{1-40}$ alkyl group, a $C_{1-40}$ alkoxy group or a di-$C_{1-6}$ alkylamino group, and more preferably a $C_{1-40}$ alkyl group or a $C_{1-40}$ alkoxy group.

The terms "$C_{1-40}$ alkoxy group" mean a linear or branched alkoxy group in which a carbon number is 1 to 40 carbon atoms, and specific examples thereof may be mentioned a methoxy group, an ethoxy group, an n-propyloxy group, an isopropyloxy group, an n-butyloxy group, a t-butyloxy group, an n-pentyloxy group, an n-hexyloxy group, an octyloxy group, a dodecyloxy group, a hexadecyloxy group, an octadecyloxy group, etc.

The terms "di-$C_{1-40}$ alkylamino group" mean a group in which the same or different two above-mentioned "$C_{1-40}$ alkyl groups" are bonded to an amino group, and specific examples thereof may be mentioned a dimethylamino group, a diethylamino group, a di-n-propylamino group, a diisopropylamino group, a di-n-butylamino group, a diisobutylamino group, a di-t-butylamino group, a di-n-pentylamino group, a di-n-hexylamino group, an N-ethyl-N-methylamino group, an N-methyl-N-n-propylamino group, an N-isopropyl-N-methylamino group, an N-n-butyl-N-methylamino group, an N-isobutyl-N-methylamino group, an N-t-butyl-N-methylamino group, an N-methyl-N-n-pentylamino group, an N-n-hexyl-N-methylamino group, an N-ethyl-N-n-propyl-amino group, an N-ethyl-N-isopropylamino group, an N-n-butyl-N-ethylamino group, an N-ethyl-N-isobutylamino group, an N-t-butyl-N-ethylamino group, an N-ethyl-N-n-pentylamino group, an N-ethyl-N-n-hexylamino group, a dioctylamino group, a didecyl-amino group, a didodecylamino group, a dihexadecylamino group, a dioctadecylamino group, a didocosylamino group, etc.

Specific Explanation of Method for Producing Triorganosilane Compound of Present Invention In the following, the respective steps (i) to (iii) of the method for producing a triorganosilane compound of the present invention will be explained.

As one aspect, the production of the triorganosilane compound of the present invention is constituted by the respective unit steps described as the following steps (i) to (iii).

As one aspect, the production of the triorganosilane compound of the present invention can be carried out by subjecting to all the unit steps described as the following steps (i) to (iii) or combining these appropriately.

Incidentally, the present specific explanation will be explained by the following.
(a) $R^1$, $R^2$ and $R^3$ in the description of the steps (i) to (iii) are the same as defined above.
(b) The specific conditions of the reaction are not particularly limited as long as production of the triorganosilane compound of the present invention can be accomplished. Preferred conditions in each reaction are appropriately described in detail.
(c) The solvent described in each reaction may be used alone or may be used in admixture of two or more kinds.

Step (i): Monotriflating Step

The present step is a step of reacting a diorganosilane compound (compound (I)) with a triflating reagent to obtain a monotriflate compound (compound (III)).

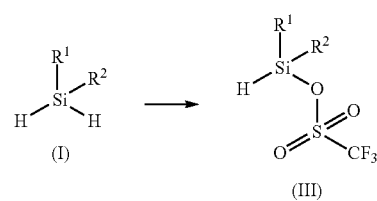

wherein $R^1$ and $R^2$ each independently represent a secondary or tertiary alkyl group having 4 or more carbon atoms which may have a substituent(s), a cycloalkyl group having 3 or more carbon atoms which may have a substituent(s), an aryl group having 6 or more carbon atoms which may have a substituent(s) or an aralkyl group having 7 or more carbon atoms which may have a substituent(s).

$R^1$ and $R^2$ are each independently preferably a secondary or tertiary alkyl group having 4 or more carbon atoms, more preferably a secondary or tertiary $C_{4-6}$ alkyl group, and further preferably a t-butyl group.

The triflating reagent to be used in the present step is not particularly limited, and examples thereof may be mentioned trifluoromethanesulfonic acid, trifluoro-methanesulfonic anhydride, trifluoromethanesulfonyl chloride, N-(2-pyridyl)bis(tri-fluoromethanesulfonimide), trimethylsilyl trifluoromethanesulfonate, etc. It is preferably trifluoromethanesulfonic acid or trimethylsilyl trifluoromethanesulfonate, and more preferably trifluoromethanesulfonic acid.

The solvent used in the present step is not particularly limited as long as it does not prohibit the reaction, and examples thereof may be mentioned an aliphatic hydrocarbon (for example, pentane, hexane, heptane), a halogen-containing hydrocarbon solvent (for example, dichloromethane, chloroform), an aromatic hydrocarbon solvent (for example, toluene, xylene), an ether solvent (for example, tetrahydrofuran, 1,4-dioxane, cyclopentyl methyl ether, methyl-t-butyl ether), an amide solvent (for example, N,N-dimethylformamide), a nitrile solvent (for example, acetonitrile), etc. It is preferably an aliphatic hydrocarbon or a halogen-containing hydrocarbon solvent, and more preferably hexane, heptane or dichloromethane.

An amount of the solvent to be used in the present step is preferably 100-fold by mass or less based on the compound (I), more preferably 1-fold by mass to 50-fold by mass, and further preferably 5-fold by mass to 20-fold by mass.

A reaction temperature is not particularly limited, and is preferably from −20° C. to the reflux temperature of the reaction mixture, more preferably −20° C. to 50° C., and further preferably −10° C. to 30° C.

Step (ii): Substituent Introducing Step

The present step is to react the compound (III) obtained in the above-mentioned step (i) with a metal reagent to obtain a triorganosilane compound (the compound (II)).

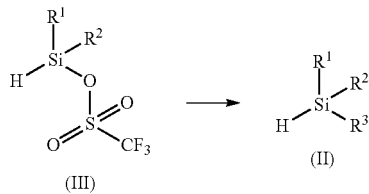

In the formula, $R^1$ and $R^2$ are the same as defined in the step (i), and $R^3$ is a substituent in the metal reagent.

In the present specification, the metal reagent means an organolithium reagent represented by $R^3Li$ (wherein $R^3$ represents an alkyl group having 3 or more carbon atoms which may have a substituent(s), a cycloalkyl group having 3 or more carbon atoms which may have a substituent(s), an aryl group having 6 or more carbon atoms which may have a substituent(s) or an aralkyl group having 7 or more carbon atoms which may have a substituent(s).), or a Grignard reagent represented by $R^3MgX$ (wherein $R^3$ represents an alkyl group having 3 or more carbon atoms which may have a substituent(s), a cycloalkyl group having 3 or more carbon atoms which may have a substituent(s), an aryl group having 6 or more carbon atoms which may have a substituent(s) or an aralkyl group having 7 or more carbon atoms which may have a substituent(s), and X represents a chlorine atom, a bromine atom or an iodine atom.).

When the metal reagent is $R^3Li$, $R^3$ is preferably a $C_{3-6}$ alkyl group or a $C_{6-12}$ aryl group which may have a substituent(s), more preferably a sec-butyl group, an n-butyl group, an n-hexyl group or a phenyl group which may have a substituent(s), and further preferably a sec-butyl group, an n-butyl group or a phenyl group which may have a substituent(s).

When the metal reagent is $R^3MgX$, $R^3$ is preferably a $C_{3-6}$ alkyl group, a $C_{6-12}$ aryl group or a $C_{7-13}$ aralkyl group, more preferably a $C_{7-13}$ aralkyl group, and further preferably a benzyl group. X is preferably a chlorine atom or a bromine atom.

Specific examples of the organolithium reagent may be mentioned n-butyl-lithium, sec-butyllithium, tert-butyllithium, n-hexyllithium, phenyllithium, etc., and specific examples of the Grignard reagent may be mentioned isopropylmagnesium bromide, tert-butylmagnesium chloride, cyclopropylmagnesium bromide, phenylmagnesium chloride, benzylmagnesium bromide, benzylmagnesium chloride, etc.

When an aryllithium wherein the metal reagent is $R^3Li$ and $R^3$ is an aryl group is used, a commercially available product may be used, or a material produced by the halogen-lithium exchange reaction using a halogenated aryl and a lithium reagent (n-butyllithium, sec-butyllithium, etc.) may be used.

An amount of the metal reagent to be used is preferably 1 equivalent to 20 equivalents based on the compound (I) used in the step (i), more preferably 1 equivalent to 10 equivalents, and further preferably 1 equivalent to 5 equivalents.

The solvent used in the present step is not particularly limited as long as it does not prohibit the reaction, and examples thereof may be mentioned an aliphatic hydrocarbon (for example, pentane, hexane, heptane), a halogen-containing hydrocarbon solvent (for example, dichloromethane, chloroform), an aromatic hydrocarbon solvent (for example, toluene, xylene), an ether solvent (for example, tetrahydrofuran, 1,4-dioxane, cyclopentyl methyl ether, methyl-t-butyl ether), an amide solvent (for example, N,N-dimethylformamide), a nitrile solvent (for example, acetonitrile), etc. It is preferably an aliphatic hydrocarbon or a halogen-containing hydrocarbon solvent, and more preferably hexane, heptane, tetrahydrofuran, cyclopentyl methyl ether or methyl-t-butyl ether.

An amount of the solvent to be used is preferably 100-fold by mass or less based on the compound (I) used in the step (i), more preferably 1-fold by mass to 50-fold by mass, and further preferably 5-fold by mass to 20-fold by mass.

A reaction temperature is not particularly limited, and is preferably from −40° C. to the reflux temperature of the reaction mixture, more preferably −20° C. to 50° C., and further preferably −10° C. to 30° C.

A reaction time is not particularly limited, and is preferably from starting the reaction to 72 hours, more preferably 0.1 to 48 hours, and further preferably 0.5 to 24 hours.

For confirmation of the progress of the reaction, the same method as in the general liquid phase organic synthetic reaction can be applied. That is, the reaction can be traced using thin layer chromatography, gas chromatography, gas chromatography/mass analysis (GC/MS), etc.

Step (iii): Hydrogenation Step

The present step is a step, when at least one of the substituents $R^1$, $R^2$ and $R^3$ of the compound (II) is an aryl group having 6 or more carbon atoms which may have a substituent(s), in which hydrogen is reacted in the presence of a metal catalyst to convert the aryl group into a cycloalkyl group. As a specific example, when the aryl group is a phenyl group, it is converted into a cyclohexyl group.

The metal catalyst used in the present step is not particularly limited, and there may be mentioned a palladium catalyst (for example, 5% palladium carbon powder STD type, 10% palladium carbon powder PE type, 5% palladium carbon powder NX type, 5% palladium carbon powder K type, 5% palladium carbon powder PE type, ASCA-2), a platinum catalyst (for example, 3% platinum carbon powder STD type, 3% platinum carbon powder SN101 type) and a ruthenium catalyst (for example, 5% ruthenium carbon powder A type, 5% ruthenium carbon powder B type, 5% ruthenium alumina powder (HYAc-5E N-type, HYAc-5E S-type). It is preferably ruthenium-alumina powder or rhodium carbon powder, and more preferably ruthenium-alumina powder.

An amount of the metal catalyst to be used is preferably 0.001-fold by mass to 5-fold by mass based on the compound (III), more preferably 0.01-fold by mass to 1-fold by mass, and further preferably 0.05-fold by mass to 0.5-fold by mass.

The hydrogen gas used in the present reaction is not necessarily to be high purity, and may contain nitrogen, methane, etc., which do not significantly affect the reduction reaction.

A reaction pressure is 0.1 to 20 MPa in terms of a hydrogen partial pressure, preferably 0.2 to 10 MPa, and particularly preferably 0.3 to 1 MPa.

The solvent used in the present step is not particularly limited as long as it does not prohibit the reaction, and examples thereof may be mentioned an aliphatic hydrocarbon (for example, pentane, hexane, heptane), a halogen-containing hydrocarbon solvent (for example, dichloromethane, chloroform), an ether solvent (for example, tetrahydrofuran, 1,4-dioxane, cyclopentyl methyl ether, methyl-t-butyl ether), an alcohol solvent (for example, methanol, ethanol, 2-propanol, 2,2,2-trifluoroethanol), etc. It is preferably an aliphatic hydrocarbon or an alcohol solvent, and more preferably hexane or heptane.

An amount of the solvent to be used is preferably 100-fold by mass or less based on the compound (III), more preferably 1-fold by mass to 50-fold by mass, and further preferably 3-fold by mass to 10-fold by mass.

A reaction temperature is not particularly limited, and is preferably from −40° C. to the reflux temperature of the reaction mixture, more preferably 0° C. to 50° C., and further preferably 10° C. to 40° C.

For confirmation of the progress of the reaction, the same method as in the general organic synthetic reaction can be applied. That is, the reaction can be traced using thin layer chromatography, gas chromatography, gas chromatography/mass analysis (GC/MS), etc.

EXAMPLES

Hereinafter, the present invention will be explained in more detail by referring to Reference Synthetic Examples and Synthetic Examples, but the present invention is not limited to these Examples.

Incidentally, in Examples, "M" means mol/L.

The proton nuclear magnetic resonance ($^1$-NMR) in Examples was measured by, unless otherwise specifically mentioned, JNM-ECP300 manufactured by JEOL, Ltd., or JNM-ECX300 manufactured by JEOL, Ltd., in deuterated chloroform solvent, and the chemical shift was shown by the δ value (ppm) when tetramethylsilane was used as the internal standard (0.0 ppm).

In the description of the NMR spectrum, "s" means singlet, "d" means doublet, "t" means triplet, "q" means quartet, "dd" means doublet of doublet, "dt" means doublet of triplet, "m" means multiplet, "br" means broad, "J" means coupling constant, "Hz" menas hertz, and "CDCl$_3$" means deuterated chloroform.

Gas chromatography/mass analysis was measured by using, unless otherwise specifically mentioned, GCMS-QP2010 Ultra manufactured by Shimadzu Corporation.

In the description of the gas chromatography/mass analysis, CI is a chemical ionization method, and M—H means a proton deficient.

In the following, unless otherwise specifically mentioned, the quantitative yield of Ph(tBu)$_2$SiH was calculated by the quantitative analysis method using the following Analytical conditions A.

<Analytical Conditions A>

Gas chromatography: GC-2030 manufactured by SHIMADZU Corporation

Column: TC-1 (30 m×0.53 mm ID, 1.5 μm) manufactured by GL Sciences Inc.

Injection method: Split 10:1

Column temperature: 50° C. (hold for 5 minutes)→temperature raised with temperature raising rate of 20° C./min→300° C. (hold for 10 minutes)

Carrier gas: Nitrogen, Linear velocity 30 cm/sec

Detector: FID, 230° C.

Standard substance: Ph(tBu)$_2$SiH synthesized by the method described in Synthetic Example 1 was purified by silica gel chromatography, which was made the standard substance.

NMR and MASS of the standard substance are shown.

$^1$H-NMR (CDCl$_3$)

δ ppm: 1.05 (18H, s), 3.85 (1H, s), 7.32-7.36 (3H, m), 7.55-7.59 (2H, m)

MASS (CI) m/z; 219.10 (M—H)$^+$

Quantitative method: Absolute calibration curve method

In the following, unless otherwise specifically mentioned, the quantitative yield of cHex(tBu)$_2$SiH was calculated by the quantitative analysis method using the Analytical conditions A.

Standard substance: cHex(tBu)$_2$SiH synthesized by the method described in Synthetic Example 5 was purified by silica gel chromatography, which was made the standard substance.

NMR and MASS of the standard substance are shown.

$^1$H-NMR (CDCl$_3$)

δppm: 1.06 (18H, s), 1.22-1.31 (11H, m), 3.18 (1H, s)

MASS (CI) m/z; 225.10 (M—H)$^+$

Quantitative method: Absolute calibration curve method

In the following, unless otherwise specifically mentioned, the quantitative yield of sBu(tBu)$_2$SiH was calculated by the quantitative analysis method using the Analytical conditions A.

Standard substance: sBu(tBu)$_2$SiH synthesized by the method described in Synthetic Example 4 was purified by silica gel chromatography, which was made the standard substance.

NMR and MASS of the standard substance are shown.

$^1$H-NMR (CDCl$_3$)

δ ppm: 0.86-0.91 (3H, m), 1.05 (18H, d, J=1.8 Hz), 1.19-1.33 (5H, m), 1.70-1.77 (1H, m), 3.30 (1H, s)

MASS (CI) m/z; 199.05 (M—H)$^+$

Quantitative method: Absolute calibration curve method

In the following, unless otherwise specifically mentioned, the quantitative yield of nBu(tBu)$_2$SiH was calculated by the quantitative analysis method using the Analytical conditions A.

Standard substance: nBu(tBu)$_2$SiH synthesized by the method described in Synthetic Example 7 was purified by silica gel chromatography, which was made the standard substance.

NMR and MASS of the standard substance are shown.

$^1$H-NMR (CDCl$_3$)

δ ppm: 0.86-0.91 (3H, m), 1.00 (18H, s), 1.27-1.38 (6H, m), 3.28-3.30 (1H, m)

MASS (CI) m/z; 199.05 (M—H)$^+$

Quantitative method: Absolute calibration curve method

For purification by silica gel column chromatography, unless otherwise specifically mentioned, either of Hi-Flash column manufactured by Yamazen Corporation, Silica gel 60 manufactured by Merck or PSQ60B manufactured by Fuji Silysia Chemical Ltd., was used.

Synthetic Example 1: Synthesis of Ph(tBu)$_2$SiH

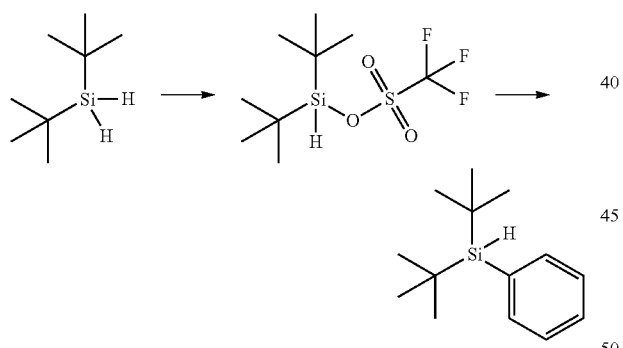

Di-tert-butylsilane (0.20 g, 1.39 mmol) was mixed with hexane (0.4 g), the mixture was cooled to 0° C., trifluoromethanesulfonic acid (0.27 g, 1.81 mmol) was added thereto and the resulting mixture was stirred at room temperature for 24 hours. In a separate vessel, sec-butyllithium (1 M hexane solution, 1.9 mL, 1.9 mmol) and phenyl bromide (0.33 g, 2.1 mmol) were mixed at 0° C., and the mixture was stirred at room temperature for 30 minutes. To the obtained reaction solution were added dropwise a mixed solution of tetrahydrofuran (0.40 g), di-tert-butylsilane and trifluoromethanesulfonic acid and the resulting mixture was stirred for 3 hours. The obtained reaction liquid was washed with 3.6 wt % hydrochloric acid (1.4 g) and a 5 wt % aqueous sodium chloride solution (1.4 g) in this order. The quantitative yield of Ph(tBu)$_2$SiH in the organic layer was 89%.

Synthetic Example 2: Synthesis of C$_{12}$H$_{25}$-C$_6$H$_4$(tBu)$_2$SiH

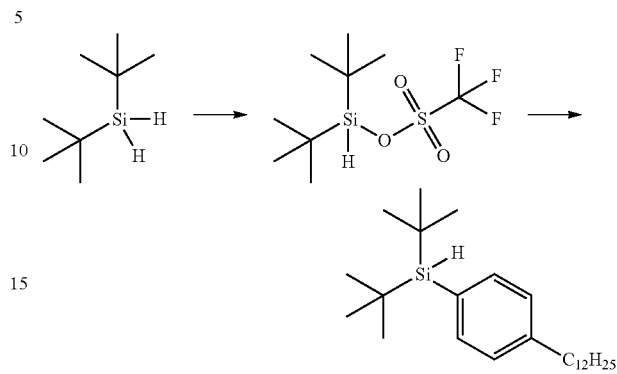

Di-tert-butylsilane (0.20 g, 1.39 mmol) was mixed with hexane (1.0 g), the mixture was cooled to 0° C., trifluoromethanesulfonic acid (0.27 g, 1.8 mmol) was added thereto and the resulting mixture was stirred at room temperature for 1 hour. In a separate vessel, sec-butyllithium (1 M hexane solution, 1.9 mL, 1.9 mmol), 1-bromo-4-dodecylbenzene (0.63 g, 1.9 mmol) and tetrahydrofuran (1.0 g) were mixed at 0° C., and the mixture was stirred at room temperature for 1 hour. To the obtained reaction solution were added dropwise a mixed solution of di-tert-butylsilane and trifluoro-methanesulfonic acid, and the resulting mixture was stirred for 15 hours. The obtained reaction liquid was diluted with hexane, and washed with a 10 wt % aqueous ammonium chloride solution (2 mL) and a 5 wt % aqueous sodium chloride solution (1.0 g) in this order. The obtained organic layer was concentrated and then purified by silica gel column chromatography to obtain C$_{12}$H$_{25}$-C$_6$H$_4$(tBu)$_2$SiH (0.32 g, Yield: 59%) as a colorless oily product.

$^1$H-NMR (CDCl$_3$)

δppm: 0.88 (3H, t, J=7.2 Hz), 1.04 (18H, s), 1.20-1.30 (18H, m), 1.59-1.61 (2H, m), 2.52-2.61 (2H, m), 3.83 (1H, s), 7.12 (2H, d, J=8.4 Hz), 7.46 (2H, d, J=8.1 Hz)

Synthetic Example 3: Synthesis of Mes(tBu)$_2$SiH

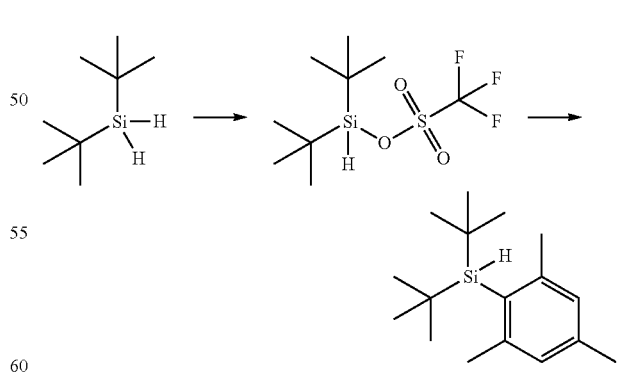

Di-tert-butylsilane (0.20 g, 1.39 mmol) was mixed with hexane (1.0 g), the mixture was cooled to 0° C., trifluoromethanesulfonic acid (0.27 g, 1.8 mmol) was added thereto and the resulting mixture was stirred at room temperature for 1.5 hours. In a separate vessel, sec-butyllithium (1 M hexane solution, 1.9 mL, 1.9 mmol), 2-bromomesitylene (0.39 g, 1.9 mmol) and tetrahydrofuran (1.0 g) were mixed at 0° C., and the mixture was stirred for 1 hour. To the obtained reaction solution were added dropwise a mixed solution of di-tert-butylsilane and trifluoromethanesulfonic acid, and the resulting mixture was stirred for 15 hours. The obtained reaction liquid was diluted with hexane, and washed with a 10 wt % aqueous ammonium chloride solution (2 mL), a 5 wt % aqueous sodium chloride solution (1.0 g) in this order. The obtained organic layer was concentrated and then purified by silica gel column chromatography to obtain Mes(tBu)$_2$SiH (0.22 g, Yield: 62%) as a colorless oily product.

$^1$H-NMR (CDCl$_3$)

δ ppm: 0.99 (18H, s), 2.28 (9H, s), 3.97 (1H, s), 6.81 (2H, s)

Synthetic Example 4: Synthesis of sBu(tBu)$_2$SiH

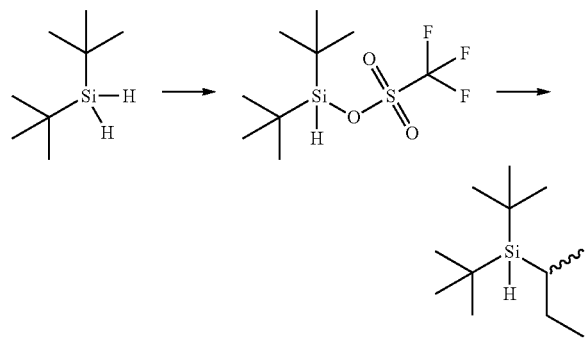

Di-tert-butylsilane (0.10 g, 0.69 mmol) and hexane (0.5 g) were mixed, the mixture was cooled to 0° C., trifluoromethanesulfonic acid (0.14 g, 0.93 mmol) was added thereto and the resulting mixture was stirred at room temperature for 1 hour. This solution was cooled to 0° C., sec-butyllithium (1 M hexane solution, 0.90 mL, 0.90 mmol) was added thereto and the resulting mixture was stirred for 10 minutes. The obtained reaction liquid was diluted with hexane, and washed with a 10 wt % aqueous ammonium chloride solution (1.0 g) and a 5 wt % aqueous sodium chloride solution (1.0 g) in this order. The obtained organic layer was concentrated and then purified by silica gel column chromatography to obtain sBu(tBu)$_2$SiH (0.19 g, Yield: 85%) as a colorless oily product.

Reference Synthetic Example 1: Synthesis of Ph(tBu)$_2$SiH

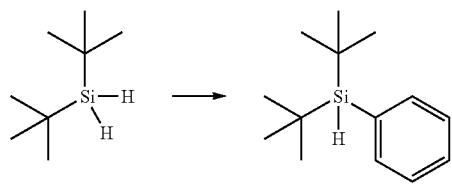

Sec-butyllithium (1 M hexane solution, 1.8 mL, 1.8 mmol) and phenyl bromide (0.13 g, 0.83 mmol) were mixed at 0° C., and the mixture was stirred at room temperature for 30 minutes. To the obtained reaction solution were added dropwise a solution in which di-tert-butylsilane (0.10 g, 0.69 mmol) and tetrahydrofuran (0.40 g) had been mixed, and the resulting mixture was stirred at room temperature for 16 hours. The obtained reaction liquid was washed with 3.6 wt % hydrochloric acid (1.4 g) and a 5 wt % aqueous sodium chloride solution (0.7 g) in this order. The quantitative yield of Ph(tBu)$_2$SiH in the organic layer was 56%.

Reference Synthetic Example 2: Synthesis of sBu(tBu)$_2$SiH

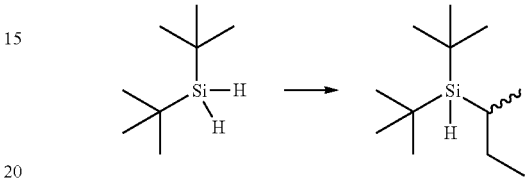

Di-tert-butylsilane (0.10 g, 0.69 mmol) was mixed with hexane (0.5 g), sec-butyllithium (1 M hexane solution, 0.90 mL, 0.90 mmol) was added to the solution at room temperature and the resulting mixture was stirred at 70° C. for 41 hours. The obtained reaction liquid was successively washed with hexane, and then, washed with a 10 wt % aqueous ammonium chloride solution (1.0 g) and a 5 wt % aqueous sodium chloride solution (1.0 g) in this order. The quantitative yield of sBu(tBu)$^2$SiH in the obtained organic layer was 4.7%.

Synthetic Example 5: Synthesis of cHex(tBu)$^2$SiH

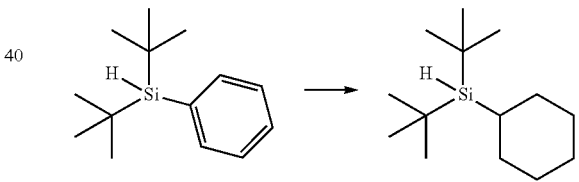

Ph(tBu)$_2$SiH (0.40 g, 1.81 mmol) was mixed with hexane (2.8 g), 5 wt % ruthenium-alumina powder (Trade name: HYAc-5E N-type, 0.16 g) was added thereto and the resulting mixture was stirred at 30° C., under hydrogen atmosphere and 0.8 MPa for 13 hours. The obtained reaction liquid was filtered, and the quantitative yield of cHex(tBu)$_2$SiH in the filtrate was 94%.

Synthetic Example 6: Synthesis of C$_{12}$H$_{25}$-cC$_6$H$_{10}$(tBu)$_2$SiH

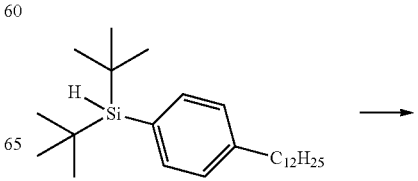

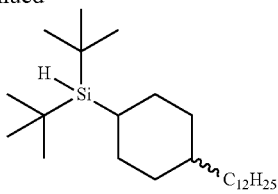

C$_{12}$H$_{25}$-C$_6$H$_4$(tBu)$_2$SiH (0.70 g, 1.80 mmol) was mixed with hexane (7.0 g), 5 wt % ruthenium-alumina powder (Trade name: HYAc-5E S-type, 0.21 g) was added thereto and the resulting mixture was stirred at 60° C., under hydrogen atmosphere and 0.8 MPa for 4 hours. Thereto was added 5 wt % ruthenium-alumina powder (0.14 g) and the resulting mixture was further stirred for 19 hours, and the obtained reaction liquid was filtered. The filtrate was concentrated and then purified by silica gel chromatography to obtain C$_{12}$H$_{25}$-cC$_6$H$_{10}$(tBu)$_2$SiH (0.56 g) as a colorless oily product.

$^1$H-NMR(CDCl$_3$)

δ ppm: 0.83-0.90 (3H, m), 1.05 (18H, s), 1.43-1.70 (32H, m), 3.18 (1H, s)

Synthetic Example 7: Synthesis of nBu(tBu)$_2$SiH

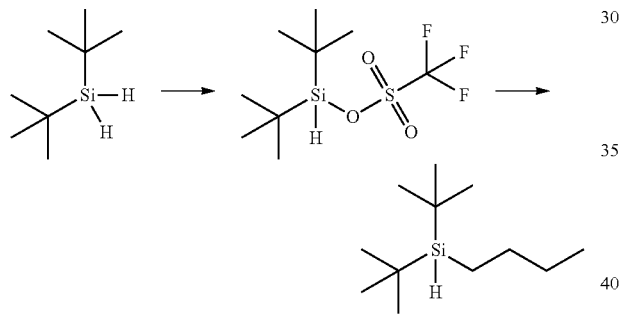

Di-tert-butylsilane (0.30 g, 2.08 mmol) was mixed with hexane (3.0 g), the mixture was cooled to 0° C., trifluoromethanesulfonic acid (0.47 g, 3.1 mmol) was added thereto and the resulting mixture was stirred at 30° C. for 2 hours. This solution was cooled to 0° C., tetrahydrofuran (1.2 g) and n-butyllithium (1.6M hexane solution, 3.3 mL, 5.2 mmol) were added thereto and the resulting mixture was stirred for 2 hours. The obtained reaction liquid was diluted with hexane, and the liquids were separated by a 10 wt % aqueous ammonium chloride solution (5 mL). The aqueous layer was extracted with hexane (3 mL), and the obtained organic layers were mixed. The quantitative yield of nBu(tBu)$_2$SiH in the organic layer was 93%.

Synthetic Example 8: Synthesis of Bn(tBu)$_2$SiH

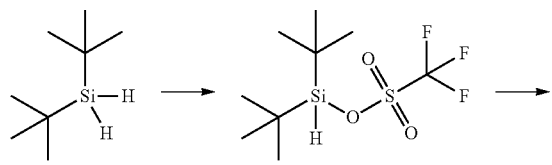

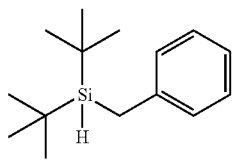

Di-tert-butylsilane (0.20 g, 1.39 mmol) was mixed with hexane (1.0 g), the mixture was cooled to 0° C., trifluoromethanesulfonic acid (0.27 g, 1.3 mmol) was added thereto and the resulting mixture was stirred at room temperature for 3 hours. To the solution was added dropwise a benzyl magnesium chloride-2M tetrahydrofuran solution (1.0 mL, 2.0 mmol), and the resulting mixture was stirred at room temperature for 4 hours. The obtained reaction liquid was diluted with tert-butyl methyl ether, and then, the liquids were separated by a 10 wt % aqueous ammonium chloride solution (2 mL). The obtained organic layer was concentrated and then purified by silica gel column chromatography to obtain Bn(tBu)$_2$SiH (0.28 g, Yield: 85%) as a colorless oily product.

$^1$H-NMR (CDCl$_3$)

δ ppm: 0.99 (18H, s), 2.22 (2H, d, J=3.5 Hz), 3.56 (1H, t, J=3.5 Hz), 7.03-7.28 (5H, m)

MASS (CI) m/z; 233.05 (M—H)$^+$

UTILIZABILITY IN INDUSTRY

According to the present invention, it can provide an effective method for producing a triorganosilane compound.

The invention claimed is:

1. A method for producing a triorganosilane compound which comprises the following steps (1) to (3);

(1) a step of reacting a diorganosilane compound represented by the formula (I):

(I)

wherein R$^1$ and R$^2$ each represent a tert-butyl group, with a triflating reagent to obtain a monotriflate compound represented by the formula (III):

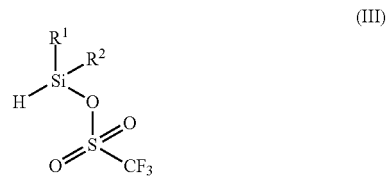

(III)

wherein R$^1$ and R$^2$ have the same meanings as defined above;

(2) a step of reacting the monotriflate compound obtained in the step (1) with a metal reagent represented by R$^3$Li or R$^3$MgX wherein R$^3$ represents an aryl group having 6 or more carbon atoms which may have one or more substituents, and X represents a chlorine atom, a bromine atom or an iodine atom, to obtain a triorganosilane compound represented by the formula (II):

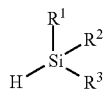

(II)

wherein $R^1$, $R^2$ and $R^3$ have the same meanings as defined above; and
(3) a step of converting the aryl group into a cycloalkyl group by reacting with hydrogen in the presence of a metal catalyst under a pressure of 0.3 to 1 MPa.

2. The method for producing a triorganosilane compound according to claim 1, wherein the metal reagent is $R^3Li$.

3. The method for producing a triorganosilane compound according to claim 2, wherein $R^3$ is a $C_{6-12}$ aryl group which may have one or more substituents.

4. The method for producing a triorganosilane compound according to claim 3, wherein $R^3$ is a phenyl group which may have one or more substituents.

5. The method for producing a triorganosilane compound according to claim 3, wherein $R^3Li$ is a $C_{6-12}$ aryllithium which may have one or more substituents prepared from a halogenated $C_{6-12}$ aryl which may have one or more substituents.

6. The method for producing a triorganosilane compound according to claim 3, wherein $R^3Li$ is a $C_{6-12}$ aryllithium which may have one or more substituents prepared by using a halogenated $C_{6-12}$ aryl which may have one or more substituents, and n-butyllithium or sec-butyllithium.

7. The method for producing a triorganosilane compound according to claim 1, wherein the metal reagent is $R^3MgX$.

8. The method for producing a triorganosilane compound according to claim 7, wherein X is a chlorine atom or a bromine atom.

9. The method for producing a triorganosilane compound according to claim 1, wherein the triflating reagent is trifluoromethanesulfonic acid, trifluoromethanesulfonic anhydride, trifluoromethanesulfonyl chloride, N-(2-pyridyl)-bis(trifluoromethanesulfonimide) or trimethylsilyl trifluoromethanesulfonate.

10. The method for producing a triorganosilane compound according to claim 9, wherein the triflating reagent is trifluoromethanesulfonic acid.

11. The method for producing a triorganosilane compound according to claim 1, wherein the metal catalyst is ruthenium-alumina powder or rhodium carbon powder.

12. The method for producing a triorganosilane compound according to claim 11, wherein the metal catalyst is ruthenium-alumina powder.

* * * * *